(12) United States Patent
Oswal et al.

(10) Patent No.: US 7,496,346 B2
(45) Date of Patent: Feb. 24, 2009

(54) AUTHORIZING A MOBILE NODE FOR SERVICE

(75) Inventors: Anand K. Oswal, Santa Clara, CA (US); Viren K Malaviya, Cupertino, CA (US); John G. Waclawsky, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 11/114,607

(22) Filed: Apr. 25, 2005

(65) Prior Publication Data

US 2006/0239235 A1 Oct. 26, 2006

(51) Int. Cl.
*H04Q 7/24* (2006.01)
(52) U.S. Cl. .................. 455/410; 455/445; 370/338
(58) Field of Classification Search .......... 455/410, 455/411, 412.1, 412.2, 414.1, 415, 445; 370/328, 370/338, 355, 466
See application file for complete search history.

(56) References Cited

U.S. PATENT DOCUMENTS

| 7,014,107 | B2* | 3/2006 | Singer et al. | 235/380 |
| 2004/0228362 | A1* | 11/2004 | Maki et al. | 370/467 |
| 2006/0045071 | A1* | 3/2006 | Vimpari et al. | 370/352 |
| 2006/0155998 | A1* | 7/2006 | Dalton et al. | 713/172 |
| 2006/0291455 | A1* | 12/2006 | Katz et al. | 370/355 |

OTHER PUBLICATIONS

John Sweeney, et al., "*Efficient SIP based Presence and IM Services with SIP message compression in IST OPIUM*", OPIUM—Blue Paper, Information Society Technologies, The Adaptive Wireless Systems (AWS) group at Cork Institute of Technology, 4 pages, Sep. 26, 2003.
"*Siemens IP Multimedia Subsystem (IMS) The Domain for Services*", © Siemens AG 2004, www.siemens-mobile.com/btob, 14 pages, 2004.
"*IP Multimedia Subsystem (IMS) Service Architecture*", White Paper, © 2004, Lucent Technologies Inc., www/lucent.com/accelerate, 12 pages, 2004.
Peter Eichinger, et al., "*IMS The IP Multimedia Subsystem*", Forschungszentrum Telekommunikation Wien, 11 pages, Printed Apr. 2005.

\* cited by examiner

*Primary Examiner*—Sam Bhattacharya
(74) *Attorney, Agent, or Firm*—Baker Botts L.L.P.

(57) ABSTRACT

Authorizing a mobile node for a service includes receiving at an enforcement point a session initiation invitation from the mobile node. The session initiation invitation comprises an authorization token and a session initiation object. Whether the mobile node is authorized to access a service is determined in accordance with the authorization token. The authorization token is sent to an authorization server if the mobile node is authorized to access the service. The session initiation object is sent to a server to initiate the service if the mobile node is authorized to access the service.

27 Claims, 2 Drawing Sheets

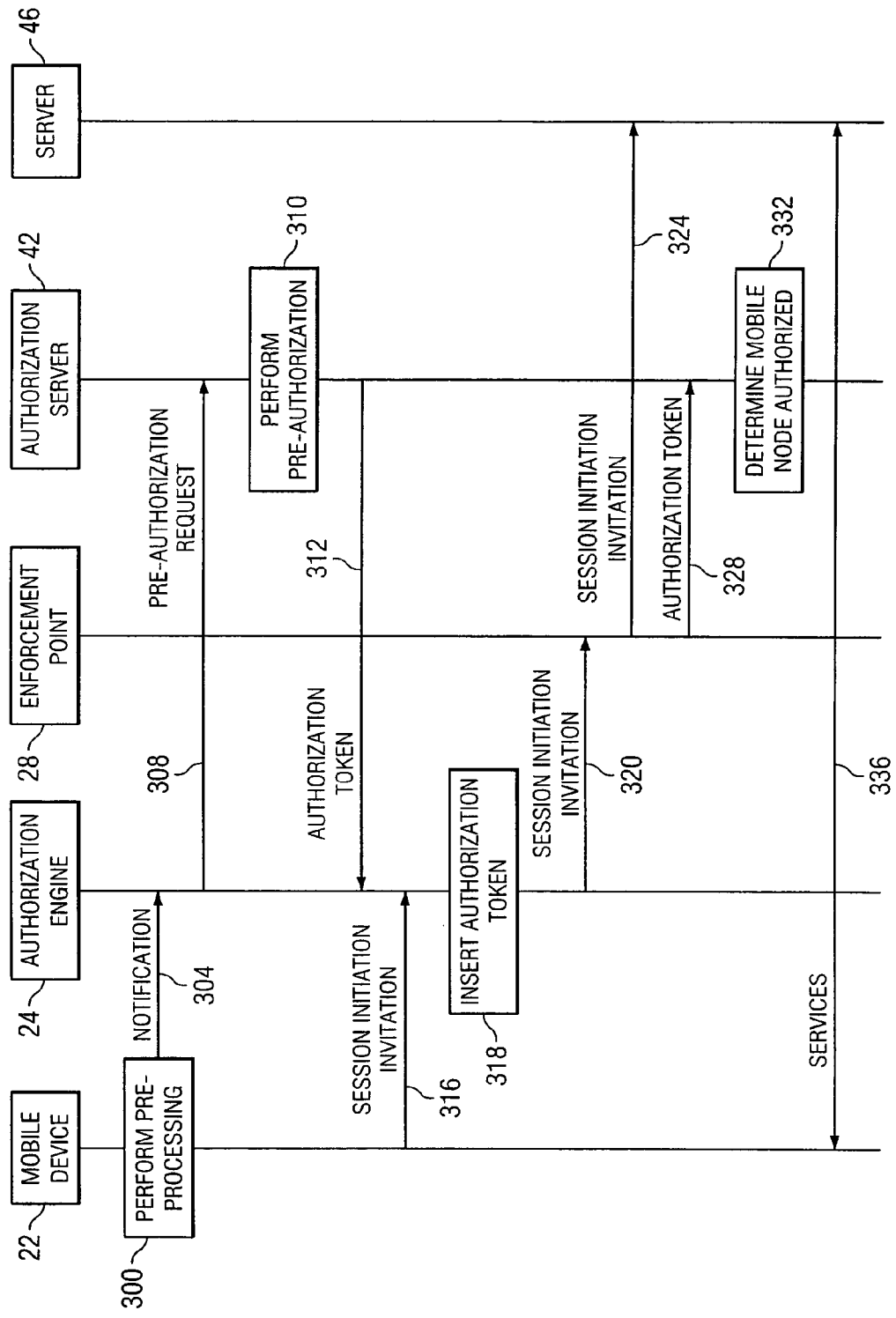

AUTHORIZING A MOBILE NODE FOR SERVICE

TECHNICAL FIELD

This invention relates generally to the field of communications and more specifically to authorizing a mobile node for service.

BACKGROUND

A communication network may establish a communication session that allows a mobile node to communicate with other endpoints. Typically, a mobile node is required to be authorized in order to access and consume services during the communication session. Accordingly, techniques are implemented to allow the communication network to authorize the mobile node.

Known techniques typically centralize the authorization process deep within the communication network. These known techniques, however, are neither efficient nor scalable in certain situations. It is generally desirable to have efficient, scalable techniques in certain situations.

SUMMARY OF THE DISCLOSURE

In accordance with the present invention, disadvantages and problems associated with previous techniques for authorizing a mobile node for service may be reduced or eliminated.

According to one embodiment of the present invention, authorizing a mobile node for a service includes receiving at an enforcement point a session initiation invitation from the mobile node. The session initiation invitation comprises an authorization token and a session initiation object. Whether the mobile node is authorized to access a service is determined in accordance with the authorization token. The authorization token is sent to an authorization server if the mobile node is authorized to access the service. The session initiation object is sent to a server to initiate the service if the mobile node is authorized to access the service.

Certain embodiments of the invention may provide one or more technical advantages. A technical advantage of one embodiment may be that a mobile node may be pre-authorized and may be provided with an authorization token that indicates the pre-authorization. The authorization token may allow the mobile node to facilitate the authorization process, which may improve network efficiency. Another technical advantage of one embodiment may be that an enforcement point may be used to forward the authorization token from the mobile node to an authorization server. The enforcement point allows the mobile node to participate in the authorization process.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a call flow diagram illustrating one embodiment of a method for authorizing a mobile node.

DETAILED DESCRIPTION OF THE DRAWINGS

Figure 1:
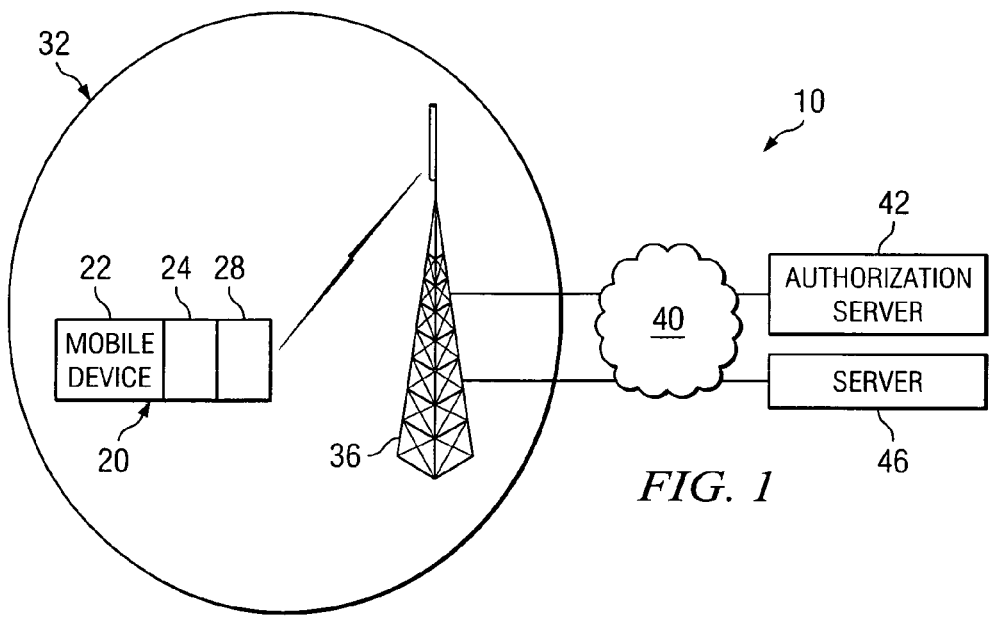
FIG. 1 is a block diagram illustrating a system that includes a mobile node with one embodiment of an enforcement point.
Figure 2:
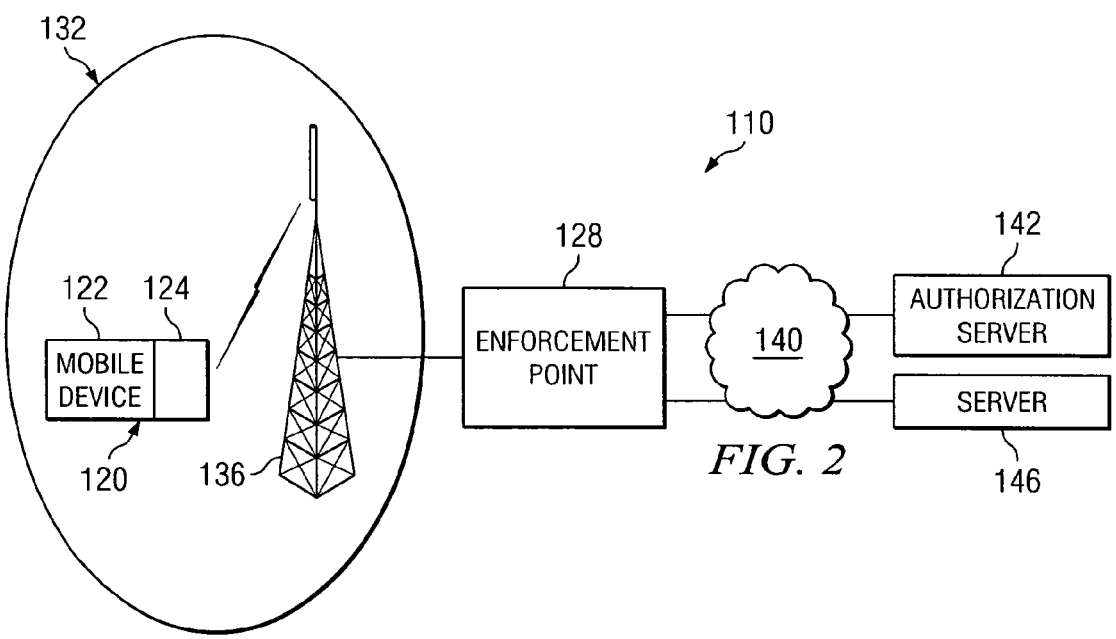
FIG. 2 is a block diagram illustrating a system that includes one embodiment of an enforcement point distinct from a mobile node.

Embodiments of the present invention and its advantages are best understood by referring to FIGS. 1 through 3 of the drawings, like numerals being used for like and corresponding parts of the various drawings.

FIG. 1 is a block diagram illustrating a system 10 that includes a mobile node 20 with one embodiment of an enforcement point. System 10 may pre-authorize mobile node 20, and provide to mobile node 20 an authorization token that indicates the pre-authorization. The authorization token may allow mobile node 20 to facilitate the authorization process, which may improve network efficiency. Allowing mobile node 20 to facilitate the authorization process moves certain operations of the authorization process toward the edge of system 10. Moving the operations towards the edge may improve network scaling and overall efficiency of the process as mobile node 20 moves through system 10.

According to the illustrated embodiment, system 10 operates to provide services such as communication sessions for endpoints such as mobile node 20. A communication session may refer to an active communication between endpoints, measured from endpoint to endpoint. Information is communicated between endpoints during a communication session. Information may refer to data, text, audio, video, multimedia, other suitable type of information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) along with mobile IP may be used to communicate the packets.

System 10 may utilize digital protocols and technologies to provide the communication sessions. Example digital protocols and technologies include those set by the Institute of Electrical and Electronics Engineers, Inc. (IEEE) 802.xx standards such as 802.11 and 802.16 standards, the Global System for Mobile communications (GSM) standards, the Internet Engineering Task Force (IETF) standards, the Universal Mobile Telecommunication System (UMTS) standard, or other standard. GSM or UMTS standards may support technology such as general packet radio service (GPRS) technologies, and IETF standards may support code division multiple access (CDMA) technologies.

According to one embodiment, system 10 may utilize Session Initiation Protocol (SIP) to set up communication sessions. Session Description Protocol (SDP) may be used to initiate the communication sessions by providing, for example, invitation and announcement services. System 10 may also utilize IP Multimedia Subsystem (IMS) control domain for facilitating and billing multimedia services. The services may include, for example, rich voice, press-to-talk, and video telephony services.

According to one embodiment, system 10 provides services to endpoints during the communication sessions. The services may be provided according to service conditions. Service conditions may designate, for example, the services that mobile node 20 may access, consume, or both access and consume.

The service conditions may also include consumption constraints that define how mobile node 20 may consume a service. For example, consumption constraints may include one or more time constraints, content constraints, data constraints, other constraints, or any combination of the preceding. A time constraint may specify a time during which mobile node 20 may access a service. For example, a mobile node 20 may be able to access a service for a specified amount of time, during a particular period time, or until an expiration time.

A content constraint may specify the content that mobile node 20 may receive. As an example, a mobile node 20 may have access to content that includes only a subset of the following: text, voice, audio, video, multimedia, or other content. As another example, a mobile node 20 having a higher security level or priority may have access to different types of content than a mobile 20 with a lower security level or priority. A data constraint may specify the amount of data that mobile node 20 may receive per unit of time. As an example, mobile node 20 may be authorized to receive a certain number of bytes per second or a total number of bytes during service usage.

According to the illustrated embodiment, system 10 includes mobile node 20, a cell 32, a cell site 36, a network 40, an authorization server 42, and a server 46 coupled as shown. Mobile node 20 may represent any suitable logic comprising software, hardware, other logic, or any suitable combination of the preceding operable to communicate with a communication system. Mobile node 20 may comprise a mobile device 22, for example, a personal digital assistant, a computer such as a laptop, a cellular telephone, a mobile handset, or any other device operable to communicate with system 10.

Mobile node 20 includes an authorization engine 24 and an enforcement point 28. Authorization engine 24 requests pre-authorization, receives an authorization token indicating pre-authorization, and inserts the authorization token into a session initiation invitation. Authorization engine 24 may comprise, for example, a subscriber identity module (SIM). The subscriber identity module may be embodied as a card, a plug-in module, or software that may be implemented with mobile node 20.

According to one embodiment, requesting pre-authorization may refer to requesting an authorization token. An authorization token may refer to a token that provides mobile node 20 authorization to access a service, permission to consume the service, other capability, or any combination of the preceding. The authorization token may include service conditions that describe the services and the consumption constraints. According to the embodiment, monitoring service delivery or billing of the service or both may begin when the authorization token is provided to mobile node 20.

As mobile node 20 moves from one cell 32 to another cell 32, mobile node 20 may use the authentication token to indicate that it is authorized to receive services. Accordingly, mobile node 20 does not need to be re-authorized for services as mobile node 20 moves. The use of the authorization token may shorten traffic flow paths, which may improve the scalability, capacity, and latency of system 10.

According to one embodiment, authorization engine 24 inserts the authorization token into the session initiation invitation as an object. A session initiation invitation may refer to a message that is sent to initiate a communication session. A session initiation invitation may comprise, for example, a session initiation protocol (SIP) invitation, and the authorization token may be carried as a session initiation protocol object of the session initiation protocol invitation.

The session initiation invitation may include a session initiation object. A session initiation object may refer to an object that is used to request a specific type of service. A session initiation object may comprise, for example, a session description protocol (SDP) object comprising a session announcement invitation. The session initiation object may include a designation of the interfaces between the origin and destinations that allow mobile node 20 to receive the service. As an example, the interfaces may be designated by port numbers and socket pairs.

Enforcement point 28 receives the session initiation invitation that includes the session initiation object and the authorization token, and determines whether to allow mobile node 20 to access a service in accordance with the authorization token. If mobile node 20 is allowed to access the service, enforcement point 28 directs the authorization token to authorization server 42, and forwards the session initiation invitation that includes the session initiation object to the content server 46.

Enforcement point 28 may also provide other authorization-related services. As an example, enforcement point 28 may create billing rights for mobile node 20, monitor the consumption of the service by mobile node 20, provide another service, or any combination of the preceding.

Cell 32 represents a geographic unit of a network attachment point of a communication network. As an example, cell 32 may represent a cell of a cellular network. Cell 32 includes cell site 36 that provides wireless services, such as wireless access, to mobile nodes 20 present in the cell 32. Mobile node 20 may be present in cell 32 if mobile node 20 is within the range of cell site 36 of cell 32. Cell site 36 operates as an access point to provide wireless services. An access point may refer to a network point that couples a wireless network, such as a wireless radio network, to a wired network, such as a wired area network. Cell site 36 may represent a base station, an access point, a network attachment point, other device operable to provide wireless services, or any combination of the preceding.

Cell site 36 may comprise any suitable logic comprising software, hardware, other logic, or any suitable combination of the preceding operable to provide wireless services to mobile node 20 present in cell 32. According to one embodiment, cell site 36 includes a base transceiver station and a base station controller. The base transceiver station communicates signals to and from mobile node 20 through a wireless link. The wireless link is typically a radio frequency link. The base station controller manages the operation of the base transceiver station. The logic at different cell sites 36 may operate according to different technologies. Accordingly, the authorization token may allow for mobile 20 to move from the different technologies of the cell sites 36.

Cell site 36 may facilitate a handover procedure. A handover procedure may refer to the process by which a communication session for mobile node 20 is passed from a previous cell site 36 to a current cell site 36 as mobile node 20 moves from a previous cell 32 to a current cell 32. A previous cell 32 refers to the cell 32 in which mobile node 20 is present prior to a handoff, and a current cell 32 refers to the cell 32 in which mobile node 20 is present after the handoff. Cell site 36 operates to redirect packets, such as traffic or control packets, in response to movement of mobile node 20.

Network 40 comprises a communication network that allows mobile node 20 to communicate with other networks or devices. A communication network may refer to a network that allows devices to communicate with each other. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Network 40 may include any suitable networks or devices that allow mobile node 20 to communicate with other networks or devices. As an example, network 40 may include an operator network comprising a communication network that is operated by a specific operator. An operator network may operate according to any suitable technology, such as wireless, cable, optical, other wireline or wireless technology, or any combination of the preceding.

As an example, network 40 may include a gateway that allow mobile node 20 to communicate with network 40. The gateway may convert communications between different communication protocols. For example, the gateway may convert communications from a protocol to any of various other protocols that may be used by network 40, or vice-versa. As another example, network 40 may include a home agent and a foreign agent. A home agent of mobile node 20 may refer to an agent that maintains the address of mobile node 20 and forwards data to mobile node 20. A foreign agent of mobile node 20 may refer to an agent that provides the home agent of mobile node 20 with an address to which data for mobile node 20 may be forwarded.

Authorization server 42 may represent any suitable logic comprising software, hardware, other logic, or any suitable combination of the preceding operable to provide authorization-related services. Authorization-related services may include services for authentication, authorization, accounting, or any suitable combination of the preceding. Authentication may refer to validating the identity of mobile node 20. Authorization may refer to authorizing a level of service for mobile node 20. Accounting may refer to tracking the usage of resources. As an example, authorization server 42 may provide one, two, or three of the listed services.

According to one embodiment, authorization server 42 determines the services that mobile node 20 may access, consume, or both access and consume. The service conditions under which mobile node 20 may access and consume the services may also be determined. Authorization server 42 generates an authorization token reflecting the services and service conditions.

Server 46 provides functionality requested by mobile node 20. Server 46 may represent any suitable logic comprising software, hardware, other logic, or any suitable combination of the preceding operable to provide the functionality. Functionality may refer to a service such as a telephony or data service.

A component of system 10 may include an interface, logic, memory, other component, or any suitable combination of the preceding. As used in this document, "interface" refers to any suitable structure of a device operable to receive input for the device, send output from the device, performing suitable processing of the input or output or both, or any combination of the preceding, and may comprise one or more ports, conversion software, or both.

Logic manages the operation of a component, and may comprise any suitable hardware, software, or combination of hardware and software. For example, logic may include a processor. As used in this document, "processor" refers to any suitable device operable to execute instructions and manipulate data to perform operations.

As used in this document, "memory" refers to any structure operable to store and facilitate retrieval of information used by the logic, and may comprise Random Access Memory (RAM), Read Only Memory (ROM), magnetic drives, disk drives, Compact Disk (CD) drives, Digital Video Disk (DVD) drives, removable media storage, any other suitable data storage device, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of authorization engine 24 and enforcement point 28 may be performed by one module, or the operations of mobile node 20 may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a block diagram illustrating one embodiment of a system 110 that includes an enforcement point 128 separate from a mobile node 120. According to the illustrated embodiment, system 110 may operate to provide services such as communication sessions for endpoints such as mobile node 120. System 10 may utilize digital protocols and technologies to provide the communication sessions in a manner substantially similar to that of system 10 of FIG. 1. According to the illustrated embodiment, system 110 includes mobile node 120, a cell 132, a cell site 136, an enforcement point 128, a network 140, an authorization server 142, and a server 146 coupled as shown.

Mobile node 120 may represent any suitable logic comprising software, hardware, other logic, or any suitable combination of the preceding operable to communicate with a communication system. Mobile node 120 may comprise a mobile device 22, for example, a personal digital assistant, a computer such as a laptop, a cellular telephone, a mobile handset, or any other device operable to communicate with system 110.

Mobile node 120 includes an authorization engine 124. Authorization engine 124 requests pre-authorization, receives an authorization token indicating pre-authorization, and inserts the authorization token into a session initiation invitation. Authorization engine 124 may perform these and other operations in a manner substantially similar to that of authorization engine 24 of FIG. 1.

Cell 132, cell site 136, network 140, authorization server 142, and server 146 may be substantially similar to cell 32, cell site 36, network 40, authorization server 42, and server 46, respectively, of FIG. 1.

Enforcement point 128 receives the session initiation invitation that includes the session initiation object and the authorization token, and determines whether to allow mobile node 120 to access a service in accordance with the authorization token. If mobile node 120 is allowed to access the service, enforcement point 128 directs the authorization token to authorization server 142, and forwards the session initiation invitation that includes the session initiation object to server 146.

Enforcement point 128 may also provide other authorization-related services. As an example, enforcement point 128 may create billing rights for mobile node 120, monitor the consumption of the service by mobile node 120, provide another service, or any combination of the preceding.

Modifications, additions, or omissions may be made to system 110 without departing from the scope of the invention. The components of system 110 may be integrated or separated according to particular needs. Moreover, the operations of system 110 may be performed by more, fewer, or other modules. Additionally, operations of system 110 may be performed using any suitable logic comprising software, hardware, other logic, or any suitable combination of the preceding.

FIG. 3 is a call flow diagram illustrating one embodiment of a method for authorizing a mobile node that may be used with system 10 of FIG. 1, system 110 of FIG. 2, or other suitable system. The method begins at step 300, where mobile device 22 of mobile node 20 performs pre-processing to initiate a communication session. During pre-processing, authorization engine 24 is notified that mobile device 22 is initiating a communication session at step 304. Authorization engine 24 sends a pre-authorization request to authorization server 42 at step 308.

Authorization server 42 performs authorization-related services for mobile node 20 at step 310. Authorization server 42 determines the services that mobile node 20 may access and consume, and the service conditions under which mobile node 20 may access and consume the services. Authorization server 42 generates an authorization token reflecting the services and service conditions, and sends the authorization token to authorization engine 24 at step 312.

Mobile device 22 sends a session initiation invitation at step 316. The session initiation invitation includes a session initiation object. Authorization engine 24 receives the session initiation invitation and inserts the authorization token as an object into the session initiation invitation at step 318. Authorization engine 24 sends the session initiation invitation to enforcement point 28 at step 320.

Enforcement point 28 determines that mobile node 20 is allowed to access a service, and forwards the session initiation invitation to server 46 at step 324. Enforcement point 28 may remove the authorization token before sending the session initiation invitation, or may leave the authorization token in the session initiation invitation.

Enforcement point 28 sends the authorization token to authorization server 42 at step 328. Authorization server 42 determines from the authorization token that mobile node 20 has been pre-authorized at step 332. The authorization token also indicates the services that mobile node 20 may access and the conditions under which mobile node may access the services. Authorization server 42 may perform additional procedures to authenticate mobile node 20. As an example, authorization server 42 may send an encrypted packet, such as an encrypted authorization token, to mobile node 20. If mobile node 20 responds appropriately, authorization server 42 may authenticate mobile node 20.

Mobile node 20 is allowed to consume the services from server 46 at step 336. The consumption of the services may be monitored to ensure that the services are consumed according to the service conditions. After mobile node 20 is allowed to consume the services, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a mobile node may be pre-authorized and may be provided with an authorization token that indicates the pre-authorization. The authorization token may allow the mobile node to facilitate the authorization process, which may improve network efficiency. Another technical advantage of one embodiment may be that an enforcement point may be used to forward the authorization token from the mobile node to an authorization server. The enforcement point allows the mobile node to participate in the authorization process.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for authorizing a mobile node for a service, comprising:

receiving at an enforcement point a session initiation invitation from a mobile node located at a first cell site, the mobile node pre-authorized to access a plurality of wireless communication services without re-authorization even if the mobile node moves to a different cell site, the session initiation invitation comprising an authorization token and a session initiation object, the authorization token comprising a description of the plurality of wireless communication services the mobile node is pre-authorized to access without re-authorization even if the mobile node moves to a different cell site;

determining whether the mobile node is authorized to access a service in accordance with the description of the plurality of wireless communication services the mobile node is pre-authorized to access;

if the mobile node is authorized to access the service:
    sending the authorization token to an authorization server;
    sending the session initiation object to a server to initiate the service; and
    continuing the service without re-authorization when the mobile node moves from the first cell site to a second cell site.

2. The method of claim 1, wherein:
the session initiation invitation comprises a session initiation protocol invitation; and
the authorization token comprises a session initiation protocol object.

3. The method of claim 1, further comprising:
monitoring consumption of the service by the mobile node; and
establishing whether the consumption conforms to one or more consumption constraints of the authorization token.

4. The method of claim 1, wherein:
the mobile node comprises the enforcement point.

5. The method of claim 1, wherein:
the enforcement point is distinct from the mobile node.

6. An enforcement point operable to facilitate authorization of a mobile node for a service, comprising:
an interface operable to:
    receive a session initiation invitation from a mobile node located at a first cell site, the mobile node pre-authorized to access a plurality of wireless communication services without re-authorization even if the mobile node moves to a different cell site, the session initiation invitation comprising an authorization token and a session initiation object, the authorization token comprising a description of the plurality of wireless communication services the mobile node is pre-authorized to access without re-authorization even if the mobile node moves to a different cell site; and a processor coupled to the interface and operable to:
 determine whether the mobile node is authorized to access a service in accordance with the description of the plurality of wireless communication services the mobile node is pre-authorized to access;
 if the mobile node is authorized to access the service:
  send the authorization token to an authorization server;
  send the session initiation object to a server to initiate the service; and
  continue the service without re-authorization when the mobile node moves from the first cell site to a second cell site.

7. The enforcement point of claim 6, wherein:
 the session initiation invitation comprises a session initiation protocol invitation; and
 the authorization token comprises a session initiation protocol object.

8. The enforcement point of claim 6, wherein the processor is further operable to:
 monitor consumption of the service by the mobile node; and
 establish whether the consumption conforms to one or more consumption constraints of the authorization token.

9. The enforcement point of claim 6, wherein:
 the mobile node comprises the enforcement point.

10. The enforcement point of claim 6, wherein:
 the enforcement point is distinct from the mobile node.

11. The enforcement point of claim 6, wherein:
 the session initiation invitation comprises a session initiation protocol invitation;
 the authorization token comprises a session initiation protocol object;
 the processor is further operable to:
  monitor consumption of the service by the mobile node; and
  establish whether the consumption conforms to one or more consumption constraints of the authorization token; and
 the mobile node comprises the enforcement point.

12. A system for authorizing a mobile node for a service, comprising:
 means for receiving at an enforcement point a session initiation invitation from a mobile node located at a first cell site, the mobile node pre-authorized to access a plurality of wireless communication services without re-authorization even if the mobile node moves to a different cell site, the session initiation invitation comprising an authorization token and a session initiation object, the authorization token comprising a description of the plurality of wireless communication services the mobile node is pre-authorized to access without re-authorization even if the mobile node moves to a different cell site;
 means for determining whether the mobile node is authorized to access a service in accordance with the description of the plurality of wireless communication services the mobile node is pre-authorized to access;
 means for performing the following if the mobile node is authorized to access the service:
  sending the authorization token to an authorization server;
  sending the session initiation object to a server to initiate the service; and
  continuing the service without re-authorization when the mobile node moves from the first cell site to a second cell site.

13. A method for authorizing a mobile node for a service, comprising:
 requesting pre-authorization for a service for a communication session for a mobile node, the pre-authorization allowing the mobile node to access a plurality of wireless communication services without re-authorization even if the mobile node moves to a different cell site;
 receiving an authorization token comprising a description of the plurality of wireless communication services the mobile node is pre-authorized to access without re-authorization even if the mobile node moves to a different cell site;
 inserting the authorization token as an object into a session initiation invitation; and
 sending the session initiation invitation to initiate the service for the communication session.

14. The method of claim 13, wherein:
 the session initiation invitation comprises a session initiation protocol invitation; and
 the authorization token comprises a session initiation protocol object.

15. The method of claim 13, wherein inserting the authorization token further comprises:
 inserting the authorization token at a subscriber identity module.

16. A mobile node operable to facilitate authorization for a service, comprising:
 an interface operable to:
  send a request for pre-authorization for a service for a communication session for the mobile node, the pre-authorization allowing the mobile node to access a plurality of wireless communication services without re-authorization even if the mobile node moves to a different cell site; and
  receive an authorization token comprising a description of the plurality of wireless communication services the mobile node is pre-authorized to access without re-authorization even if the mobile node moves to a different cell site; and
 a processor coupled to the interface and operable to:
  insert the authorization token as an object into a session initiation invitation; and
 the interface further operable to:
  send the session initiation invitation to initiate the service for the communication session.

17. The mobile node of claim 16, wherein:
 the session initiation invitation comprises a session initiation protocol invitation; and
 the authorization token comprises a session initiation protocol object.

18. The mobile node of claim 16, wherein the processor is further operable to insert the authorization token by:
 inserting the authorization token at a subscriber identity module.

19. The mobile node of claim 16, wherein:
 the session initiation invitation comprises a session initiation protocol invitation;
 the authorization token comprises a session initiation protocol object; and
 the processor is further operable to insert the authorization token by:
  inserting the authorization token at a subscriber identity module.

20. A system for authorizing a mobile node for a service, comprising:
- means for requesting pre-authorization for a service for a communication session for a mobile node, the pre-authorization allowing the mobile node to access a plurality of wireless communication services without re-authorization even if the mobile node moves to a different cell site;
- means for receiving an authorization token comprising a description of the plurality of wireless communication services the mobile node is pre-authorized to access without re-authorization even if the mobile node moves to a different cell site;
- means for inserting the authorization token as an object into a session initiation invitation; and
- means for sending the session initiation invitation to initiate the service for the communication session.

21. A network for authorizing a mobile node for a service, comprising:
- a mobile node operable to:
  - send a request for pre-authorization for a service for a communication session for the mobile node, the pre-authorization allowing the mobile node to access a plurality of wireless communication services without re-authorization even if the mobile node moves to a different cell site;
  - receive an authorization token comprising a description of the plurality of wireless communication services the mobile node is pre-authorized to access without re-authorization even if the mobile node moves to a different cell site;
  - insert the authorization token as an object into a session initiation invitation comprising a session initiation object; and
- an enforcement point operable to:
  - receive the session initiation invitation from the mobile node;
  - determine whether the mobile node is authorized to access a service in accordance with the authorization token;
  - if the mobile node is authorized to access the service:
    - send the authorization token to an authorization server;
    - send the session initiation object to a server to initiate the service; service; and
    - continue the service if the mobile node moves from a first cell site to a second cell site.

22. The network claim 21, wherein:
the session initiation invitation comprises a session initiation protocol invitation; and
the authorization token comprises a session initiation protocol object.

23. The network claim 21, wherein the enforcement point is further operable to:
monitor consumption of the service by the mobile node; and
establish whether the consumption conforms to one or more consumption constraints of the authorization token.

24. The network claim 21, wherein:
the mobile node comprises the enforcement point.

25. The network claim 21, wherein:
the enforcement point is distinct from the mobile node.

26. The network claim 21, wherein the mobile node is further operable to insert the authorization token by:
inserting the authorization token at a subscriber identity module.

27. The network claim 21, wherein:
the session initiation invitation comprises a session initiation protocol invitation;
the authorization token comprises a session initiation protocol object;
the enforcement point is further operable to:
monitor consumption of the service by the mobile node; and
establish whether the consumption conforms to one or more consumption constraints of the authorization token;
the mobile node comprises the enforcement point; and
the mobile node is further operable to insert the authorization token by:
inserting the authorization token at a subscriber identity module.

* * * * *